United States Patent
Hapke et al.

(10) Patent No.: US 7,262,868 B2
(45) Date of Patent: Aug. 28, 2007

(54) METHOD OF AND APPARATUS FOR ASCERTAINING THE TRANSVERSE DIMENSIONS OF ROD-SHAPED ARTICLES

(75) Inventors: Siegfried Hapke, Geesthacht (DE); Dirk Sacher, Wentorf (DE); Dierk Schröder, Hamburg (DE); Peter Straube, Hamburg (DE)

(73) Assignee: Hauni Maschinenbau AG, Hamburg (DE)

( * ) Notice: Subject to any disclaimer, the term of this patent is extended or adjusted under 35 U.S.C. 154(b) by 653 days.

(21) Appl. No.: 10/771,623

(22) Filed: Feb. 5, 2004

(65) Prior Publication Data

US 2004/0173225 A1    Sep. 9, 2004

(30) Foreign Application Priority Data

Feb. 5, 2003    (DE) ................ 103 04 503

(51) Int. Cl.
*G01B 11/08*    (2006.01)
(52) U.S. Cl. ....................... 356/635; 356/638
(58) Field of Classification Search ......... 356/625–640
See application file for complete search history.

(56) References Cited

U.S. PATENT DOCUMENTS

| | | | |
|---|---|---|---|
| 3,461,299 A * | 8/1969 | Felix ..................... | 250/559.12 |
| 4,139,890 A | 2/1979 | Yerkes et al. | |
| 4,893,960 A | 1/1990 | Heitmann et al. | |
| 5,009,238 A | 4/1991 | Heitmann | |
| 5,028,798 A * | 7/1991 | Biswas et al. ......... | 250/559.21 |
| 5,072,121 A * | 12/1991 | Jazbec .................. | 250/363.04 |
| 5,135,008 A | 8/1992 | Oesterling et al. | |
| 5,212,539 A * | 5/1993 | Wogerbauer ............... | 356/627 |
| 5,457,537 A * | 10/1995 | Richter ....................... | 356/625 |
| 5,715,843 A | 2/1998 | Hapke et al. | |
| 5,930,734 A | 7/1999 | Hofmann et al. | |
| 6,407,818 B1 * | 6/2002 | Whitehouse ................ | 356/627 |

FOREIGN PATENT DOCUMENTS

| | | |
|---|---|---|
| DE | 27 29 576 A1 | 1/1979 |
| DE | 195 23 273 | 1/1997 |
| EP | 0 909 537 | 4/1999 |
| GB | 2 121 956 A | 1/1984 |
| GB | 2 124 762 A | 2/1984 |

\* cited by examiner

*Primary Examiner*—Hoa Q. Pham
(74) *Attorney, Agent, or Firm*—Venable LLP; Robert Kinberg; Catherine M. Voorhees (57) ABSTRACT

The invention relates to a method of and to an apparatus for ascertaining the transverse dimensions, such as diameters, of one or more rod-shaped articles, for example, continuous or finite-length cigarette rods and/or other rod-shaped smokers' products. When the method and/or the apparatus is utilized to ascertain the transverse dimensions of a single rod-shaped article, such as a continuous cigarette rod-which is stationary, which turns about its longitudinal axis and/or which is moved lengthwise, the apparatus can employ at least one radiation source which emits a beam of radiation against the stationary or moving article whereby the article intercepts a first portion of the beam and permits the remaining portion to impinge upon a device which evaluates the non-intercepted portion of the beam and generates signals denoting the diameter of the article. The apparatus also employs an arrangement, such as a motor and a belt-and-pulley device, for selectively altering the orientation of the beam and the article relative to each other; this enables the evaluating device to furnish signals which can be processed to indicate whether or not the article is round or out of round.

42 Claims, 2 Drawing Sheets

METHOD OF AND APPARATUS FOR ASCERTAINING THE TRANSVERSE DIMENSIONS OF ROD-SHAPED ARTICLES

CROSS-REFERENCE TO RELATED CASES

This application claims the priority of the commonly owned German patent application Serial No. 103 04 503.1 filed Feb. 5, 2003. The disclosure of this German patent application, as well as that of each US and/or foreign patent and/or patent application identified in the specification of the present application is incorporated herein by reference.

BACKGROUND OF THE INVENTION

The invention relates to improvements in methods of and in apparatus for ascertaining the transverse dimensions of elongated articles or commodities, especially the diameters of rod-shaped smokers' products. More particularly, the invention relates to a method and to an apparatus which can be utilized to ascertain transverse dimensions of single rod-shaped articles or to simultaneously ascertain the transverse dimensions of plural rod-shaped articles, such as continuous cigarette rods, continuous filter rods, discrete plain or filter cigarettes and the like. Still more particularly, the invention relates to improvements in methods and apparatus wherein at least one source emits a beam of radiation which impinges and is partially intercepted by a stationary or moving rod-shaped article, and wherein the non-intercepted portion of the beam is evaluated by an arrangement, such as an optical system, which serves to generate signals denoting the diameter of that portion of the article which partially intercepts the beam, normally for a relatively short interval of time.

When the method and the apparatus of the present invention are put to use in connection with the determination of transverse dimensions of rod-shaped or substantially rod-shaped articles or products of the tobacco processing industry, such as plain or filter cigarettes, cigarette rods or filter rods, the term "rod-shaped articles" or "rod-shaped products" (hereinafter referred to as "rod-shaped articles") is intended to encompass or embrace all kinds of rod-shaped articles which are being turned out and/or processed by the tobacco processing industry, i.e., also cigars, cigarillos, papyrossy and many others. The determination of transverse dimensions (such as diameters) of the articles can be carried out during any one of numerous stages of the making and/or processing thereof, e.g., in a cigarette rod making machine or downstream of such machine. Thus, the improved method and apparatus can be put to use to ascertain the transverse dimensions of continuous rod-shaped articles (e.g., cigarette rods issuing from a cigarette making machine and advancing into the range of a so-called cutoff which subdivides the rod into a series or file of discrete plain cigarettes of unit length or multiple unit length). Alternatively, the improved method and apparatus can be resorted to in order to ascertain the transverse dimensions of discrete plain or filter cigarettes, cigars, cigarillos, filter rod sections of unit length or multiple unit length and the like.

The diameter is a very important parameter in connection with the making of smokers' products, such as plain or filter cigarettes. Therefore, it is customary and desirable to ascertain the diameter in order to ensure the making of highly satisfactory smokers' products which are pleasing to the eye, which can be properly attached to adjoining rod-shaped products and/or which can be properly assembled with identical or analogous rod-shaped products for confinement in boxes, packs, cartons or other types of containers. In many instances, a presently known ascertainment of diameters (i.e., of transverse dimensions) is being carried out while the rod-shaped articles move through the diameter-ascertaining apparatus lengthwise, i.e., in the direction of their longitudinal axes, either continuously or discontinuously (e.g., stepwise).

A drawback of the presently known methods and apparatus of the just outlined character is that they are not sufficiently reliable if the rod-shaped articles are not exactly round, i.e., if their cross-sectional outlines (in planes which are normal to their longitudinal axes) are not exactly circular or sufficiently close to circular outlines. For example, European patent No. 0 909 537 A1 discloses a diameter ascertaining apparatus wherein a source of radiation emits a wide beam of parallel (collimated) rays and directs the beam against a mirror which is arranged to deflect the beam through 90° so that the beam impinges upon a radiation processing or evaluating unit. The rod-shaped article extends lengthwise in such a way that it is parallel to the reflecting surface of the mirror and at right angles to the direction of propagation of the radiation. The arrangement is such that a first portion of the radiation impinges directly upon the rod-shaped article and a second portion of the radiation reaches the article subsequent to deflection by the mirror. In other words, the radiation reaching the evaluating unit includes a first section which is being propagated from the source directly to the evaluating unit and a second section which is adjacent the first section and reaches the evaluating unit subsequent to deflection by the mirror. The two sections represent those diameters of the article which cross two axes that are normal to each other. The just described patented apparatus is capable of ascertaining the diameters of rod-shaped articles which need not or should not turn about their longitudinal axes; this is an important advantage when the articles are endless rods containing natural, reconstituted and/or substitute tobacco and/or filter material for tobacco smoke. However, these apparatus also exhibit a serious drawback, namely that the measurements which can be carried out therewith are not sufficiently reliable. This is attributable to the fact that the patented apparatus can ascertain only two diameters of a rod-shaped article, i.e., the number of measurements in a selected plane extending at right angles to the axis of the elongated rod-shaped article is insufficient to permit a detection of portions which might be bounded by surfaces that depart (even significantly) from surfaces on a cylindrical article.

German patent No. 195 23 273 A1 discloses a second method of and a second apparatus for ascertaining the diameters of rod-shaped articles of the tobacco processing industry, e.g., of cigarettes and the like. The article to be tested rotates about its longitudinal axis during movement through a stationary apparatus. The thus manipulated article is exposed to radiation in such a way that at least a certain amount of radiation not intercepted by the article being tested is utilized to generate an electric first signal. Several of the thus obtained first signals are processed to furnish a second signal denoting the diameter of the article. The just described second apparatus exhibits the advantage that its accuracy exceeds those of other presently known apparatus; however, the versatility of the second apparatus is unsatisfactory, particularly or primarily because it cannot be put to use for the determination of diameters of rod-shaped articles which do not turn about their longitudinal axes.

Commonly owned U.S. Pat. No. 5,715,843 (granted Feb. 10, 1998 to Hapke et al. for "METHOD OF AND APPARATUS FOR MEASURING THE DIAMETERS OF ROD- SHAPED ARTICLES OF THE TOBACCO PROCESSING INDUSTRY") discloses an arrangement for ascertaining the diameters of rod-shaped articles of the tobacco processing industry while the articles advance sideways along the periphery of a rotary drum-shaped conveyor and are rotated about their longitudinal axes as a result of frictional engagement with a rolling member adjacent the periphery of the conveyor. Successive articles intercept a beam of radiation issuing from a laser, either once or more than once, and the amounts of intercepted radiation are indicative of the diameters of the respective articles. This apparatus is quite satisfactory for the ascertainment of diameters of rod-shaped articles of finite length while the articles perform the aforementioned composite movements.

OBJECTS OF THE INVENTION

An important object of the present invention is to provide a novel and improved method of ascertaining the transverse dimensions (hereinafter mostly called diameters) of one or more rod-shaped articles which is more accurate than presently known methods even though it can be practiced without necessitating a turning of the articles about their longitudinal axes.

Another object of the invention is to provide a method which can be utilized with advantage to determine the transverse dimensions of continuous rod-shaped articles, e.g., of cigarette rods or filter rods issuing from a cigarette making or filter rod making machine and being ready to be subdivided into cigarettes or filter mouthpieces of unit length or multiple unit length.

A further object of the invention is to provide an apparatus which can be utilized for the practice of the above outlined method.

An additional object of the present invention is to provide an apparatus which can simultaneously ascertain the transverse dimensions of a plurality of rod-shaped articles.

Still another object of the instant invention is to provide an apparatus which can be put to use in or in conjunction with existing machines or production lines for the making of rod-shaped articles, for example, in or with cigarette making machines which are designed to simultaneously turn out two parallel continuous cigarette rods.

An additional object of this invention is to provide a novel and improved mounting of mobile parts in the above outlined apparatus, e.g., of devices which generate and process beams of radiation being directed against one or more stationary or moving rods of tobacco and/or filter material for tobacco smoke.

SUMMARY OF THE INVENTION

One feature of the present invention resides in the provision of an apparatus for ascertaining the transverse dimensions of at least one at least substantially rod-shaped article while the article is maintained in a predetermined position. The improved apparatus comprises at least one measuring arrangement which includes at least one radiation source arranged to direct at least one beam of radiation against the at least one article occupying the predetermined position whereby the article intercepts a portion of the beam (namely that portion which is indicative of a transverse dimension of the article), a device (such as a sensor) which serves to generate on the basis of the thus influenced beam of radiation signals denoting the transverse dimensions of the at least one article in plural orientations of the at least one article and the beam relative to each other, and means for selectively altering the orientation of the beam and the at least one article relative to each other.

The at least one article can form part of or it can constitute a smokers' product, e.g., a continuous cigarette rod which issues from a cigarette rod making machine.

The at least one measuring arrangement can comprise at least one optical element, e.g., a collimator lens between the radiation source and the at least one article occupying the predetermined position.

The at least one radiation source (e.g., a laser diode) can be arranged to direct short-lasting beams of radiation against the at least one article occupying the predetermined position.

The apparatus can further comprise means for maintaining the at least one article at a standstill during exposure to the beam of radiation and/or means for moving the at least one article during exposure to the beam of radiation.

The altering means can include means (such as a driven pulley or sprocket wheel) for moving the at least one article relative to the beam or vice versa.

The radiation source can be arranged to direct a beam at least substantially at right angles to a longitudinal axis of the article occupying the predetermined position.

It is also possible to provide the altering means with means for turning the beam about an axis which is at least substantially parallel to a longitudinal axis of the article occupying the predetermined position.

Still further, the altering means can include means (such as a driven pulley or sprocket wheel) for turning the beam about an axis which coincides with a longitudinal axis of the article occupying the predetermined position.

The improved apparatus can further comprise means (such as an electronic circuit) for evaluating the signals and for generating output signals denoting averaged transverse dimensions of the article.

If the orientation altering means includes means for moving the beam relative to the at least one article, the moving means can be arranged to move the beam relative to a point within the at least one article occupying the predetermined position.

The apparatus can comprise a plurality of (e.g., two) measuring arrangements for simultaneously ascertaining the transverse dimensions of a plurality of rod-shaped articles each of which is maintained in a predetermined position relative to the respective measuring arrangement. The measuring arrangements are preferably adjacent each other and the orientation altering means of each such arrangement can include means for synchronously altering the orientation of beams which are generated by the radiation sources of the plurality of measuring arrangements.

The means for simultaneously altering the orientation of the plural beams can include mobile components (such as housings) of the measuring arrangements and means for moving the mobile components in synchronism with each other relative to points which are located within the confines of the articles assuming the predetermined positions relative to the respective measuring arrangements. The moving means can be arranged to move the mobile components relative to points which are located within the confines of the respective articles. If the articles are of the type having longitudinal axes, the aforementioned points can be located at least close to the axes of the respective articles or in planes which are inclined relative to the axes of the respective articles.

The altering means of each of the plural measuring arrangements can include means for altering the orientation of the beams through angles of at least close to 180°.

If the number of measuring arrangements is two and such measuring arrangements are adjacent each other, the means for synchronously altering the orientation of the beams can include means for moving the beams in opposite directions. Such altering means can be arranged to move each of the beams between two end positions in each of which the measuring arrangements are disposed at least substantially opposite each other. Each of the measuring arrangements can comprise a housing having a longer section and a shorter section, and the longer section of at least one of the housings is preferably turnable away from the measuring arrangement embodying the other housing.

Another feature of the instant invention resides in the provision of a method of ascertaining the transverse dimensions of at least one at least substantially rod-shaped article while the article is maintained in a predetermined position. The improved method comprises the steps of directing a variable-orientation beam of radiation against the at least one article which occupies the predetermined position whereby the article intercepts a portion of the beam which is indicative of a transverse dimension (i.e., one diameter if the article is a round: rod-shaped article), repeatedly altering the orientation of the beam and the at least one article relative to each other, evaluating the non-intercepted portion of the beam in each orientation of the beam and of the at least one article relative to each other, and generating on the basis of evaluated radiation signals which denote the respective transverse dimensions of the article.

As already mentioned hereinbefore, the at least one rod-shaped article can constitute or form part of a smokers' product.

The radiation can constitute optical radiation and the aforementioned directing step can include directing a short-lasting beam of radiation against the at least one article which occupies the predetermined position.

The altering step can include selectively changing the orientation of the beam relative to the at least one article, and the improved method can further comprise the step of processing the aforementioned signals into signals denoting the average transverse dimensions (such as diameters) of the articles.

As a rule, or at least in many instances, the orientation altering step can include moving the beam relative to a point within the at least one article which occupies the predetermined position. The beam is supplied by a laser diode or another suitable source of radiation, and the just mentioned moving step can include turning the radiation source relative to the aforementioned point. The radiation source can form part of a measuring arrangement, and the moving step can include turning at least a portion of the measuring arrangement relative to the aforementioned point; such point can be located in a plane which is inclined relative to a longitudinal axis of the article occupying the predetermined position. The moving step can include turning the beam relative to the aforesaid axis through an angle which at least approximates 180°.

The directing step of the improved method can include orienting the beam so that it impinges upon the article occupying the predetermined position at least substantially at right angles to the longitudinal axis of the article In accordance with a modification, the orientation altering step can include moving the beam relative to the article about one of two axes one of which is at least substantially parallel to and the other of which coincides with a longitudinal axis of the article occupying the predetermined position.

The directing step of the improved method can be carried out by a radiation source in a housing of a measuring arrangement, and the orientation altering step of such method can include moving at least a portion of the measuring arrangement (e.g., a housing of the measuring arrangement) between a plurality of positions relative to the at least one rod-shaped article occupying the predetermined position. The directing step of this embodiment of the improved method can include short-lasting exposure of the article to radiation in each of the plurality of positions of the aforementioned portion of the measuring arrangement.

If the improved method is to be resorted to for simultaneous ascertainment of the transverse dimensions of plural rod-shaped articles while such articles are maintained in predetermined positions, the directing step includes directing a discrete variable-orientation beam against each of the plural articles, and the orientation altering step includes jointly moving the discrete beams relative to the respective articles. The discrete beams can be moved in synchronism with each other. For example, the orientation altering step can include moving the beam for one of the plural articles in a first direction and moving the beam for another of the plural articles in a second direction at least substantially counter to the first direction.

The plural articles can include first and second articles which are located close to each other, and the orientation altering step can include turning the beams for the first and second articles between two end positions in each of which the beam for one of the first and second articles is located opposite the beam for the other of the first and second articles. The beams for the first and second articles can be furnished by discrete first and second measuring arrangements having housings including shorter and longer sections, and the longer section of each of the housings can be arranged to turn away from the other measuring arrangement in response to turning of the respective beams to selected end positions.

The novel features which are considered as characteristic of the invention are set forth in particular in the appended claims. The improved apparatus itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawing.

DESCRIPTION OF PREFERRED EMBODIMENTS

Figure 1:
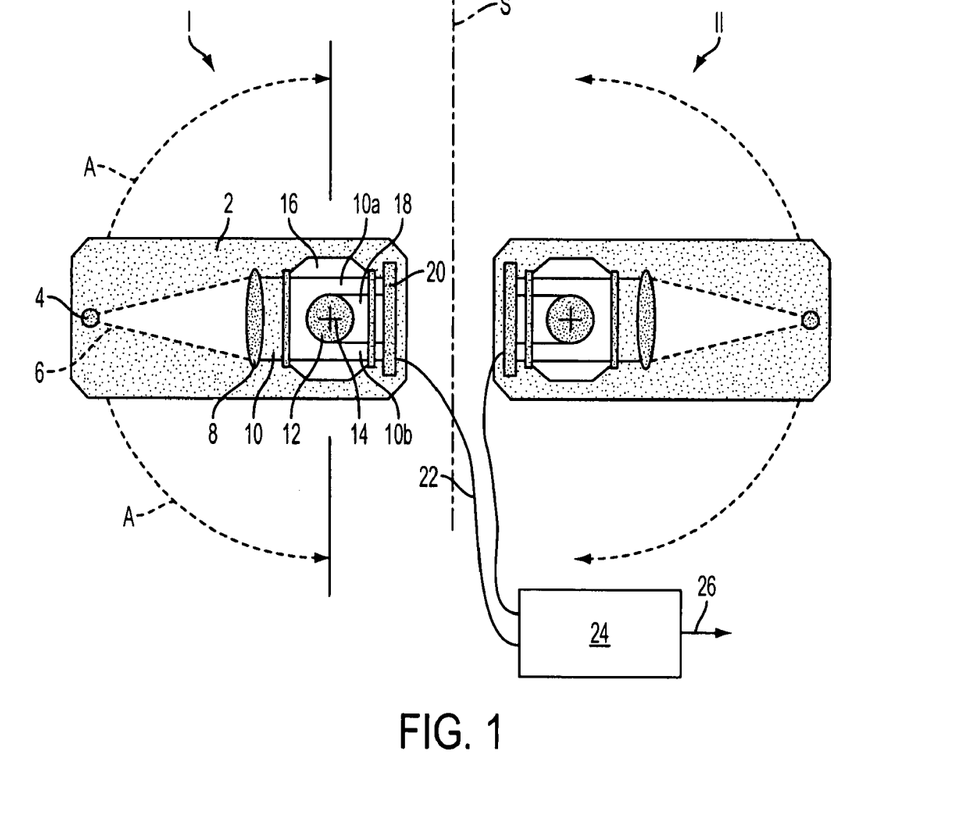
FIG. 1 is a somewhat schematic sectional view of a portion of an apparatus which embodies one form of the present invention and is designed to simultaneously ascertain the transverse dimensions of two spaced-apart parallel rod-shaped articles, such as continuous cigarette rods issuing from a dual cigarette rod making machine.

FIG. 1 is a schematic sectional view of an apparatus which is designed to simultaneously monitor the diameters (actually the transverse dimensions) of two parallel or substantially parallel cigarette rods 12 issuing from a suitable cigarette making machine. Certain details of twin or dual cigarette rod making machines are disclosed, for example, in commonly owned U.S. Pat. Nos. 4,893,640 (granted Jan. 16, 1990 to Heitmann et al. for "MULTIPLE-ROD CIGARETTE MAKING MACHINE") and 5,009,238 (granted Apr. 23, 1991 to Heitmann for "APPARATUS FOR SUPPLYING FIBROUS MATERIAL TO MACHINES FOR SIMULTANEOUSLY PRODUCING A PLURALITY OF CIGARETTE RODS"). The paths for the rods 12 are defined by troughs, belt conveyors or other suitable transporting or advancing means, not shown.

The apparatus of FIG. 1 comprises two measuring arrangements I and II, one for each of the rods 12. Since the illustrated arrangements are (or can be) identical with each other, only one thereof (namely the arrangement I) will be described and explained in full detail.

The arrangement I comprises a housing 2 which confines or accommodates a photocell having a radiation source 4 such as a laser diode or a light-emitting diode (LED) arranged to emit a highly concentrated radiation 6 in the visible or infrared range. A collimator lens 8 is provided to transform the beam 6 into a telecentric light curtain or light ray or beam (parallel light) 10. The beam 10 impinges upon and is partly intercepted by the respective rod-shaped article 12.

The article 12 can be maintained at a standstill or can move (either continuously or intermittently) in the direction of its longitudinal axis 14, i.e., at right angles to the plane of FIG. 1. To this end, the housing 2 is provided with a suitable through passage or opening 16 which is normal to the direction of propagation of the beam 10. The arrangement is such that the longitudinal axis 14 of the rod-shaped article 12 is normal to the beam 10 and the latter is propagated in a plane which includes a cross-sectional area of the article.

As already mentioned hereinbefore, the articles 12 which are measured in the apparatus and in accordance with the method of the present invention can constitute any one of numerous commodities which resemble or constitute elongated rods normally having or normally desired to have an at least substantially circular cross-sectional outline. These articles can consist of a single material or of two, three or more different substances. If the articles are to be used as or to form part of smokers' products, they can constitute plain or filter cigarettes, continuous cigarette rods, continuous filter rods, filter mouthpieces, cigars, cigarillos or the like. The testing can take place during any one of numerous stages of processing of smokers' products, e.g., prior or subsequent to the step of uniting filter rod sections of unit length or multiple unit length with plain cigarettes of unit length or multiple unit length. A machine which turns out filter cigarettes and can employ one or more apparatus embodying the present invention is disclosed, for example, in commonly owned U.S. Pat. No. 5,135,008 granted Aug. 4, 1992 to Oesterling et al. for "METHOD OF AND APPARATUS FOR MAKING FILTER CIGARETTES".

One presently preferred stage of processing rod-shaped smokers' products during which the products can be tested in accordance with the method and in one or more apparatus of the present invention is that when a continuous cigarette rod is caused to move lengthwise toward the so-called cutoff which subdivides the rod into a succession or file of plain cigarettes ready to be transported to a packing machine or to a filter tipping machine (such as that disclosed in the aforementioned U.S. Pat. No. 5,135,008 to Oesterling et al.).

That portion of the article 12 which advances through the opening or passage 16 of the housing 2 in the measuring arrangement I intercepts a portion of the telecentric light beam 10 but permits the lateral beam portions 10a and 10b to impinge upon a photosensitive detector or sensor 20. For example, the sensor 20 can consist of a CCD array of cells and is connected to an electronic signal processing or evaluating circuit 24 by a cable 22. The circuit 24 is designed to ascertain the transverse dimension (normally the diameter) of the irradiated article portion in the passage 16 on the basis of the light-dark information furnished by the sensor 20, i.e., as a function of the dimensions of the dark region 18 between the non-interrupted portions 10a, 10b of the beam 10.

In the embodiment which is shown in FIG. 1, the housing 2 of each of the two measuring arrangements I and II is turnable about an axis which coincides with the longitudinal axis 14 of the respective rod-shaped article 12. A measurement is or can be carried out prior as well as subsequent to each turning of the housing 2. This ensures that the measuring arrangements I and II can ascertain different diameters of the respective articles 12. It is assumed that the housing 2 of the measuring arrangement I is turnable clockwise and counterclockwise from the position which is shown in FIG. 1, namely through angles A of +90° and −90°, i.e., an angle of 180°. If a measurement is carried out several times during each turning of the housing 2 of the arrangement I through each of the 90°-angles A, one obtains information pertaining to the entire cross-sectional area of the respective rod-shaped article 12. In order to eliminate potential lack of sharpness due to movement of the measuring arrangement I and/or II, it is desirable to ensure that each discrete measurement be completed within a short or very short interval of time.

In accordance with a presently preferred proposal, this can be readily achieved by resorting to measuring arrangements each of which employs a source 4 of pulsating radiation and a correspondingly synchronized sensor 20. In accordance with another presently preferred embodiment, one can employ a source 4 which emits an uninterrupted beam 10 and a sensor 20 which is arranged to be repeatedly exposed to the beam portions 10a and 10b for short intervals of time.

The evaluating circuit 24 ascertains for each of the rod-shaped articles a number of diameters which is a function of the number of changes of angular positions of the housings 2 of the measuring arrangements I and II. The circuit 24 is preferably designed and arranged to average the ascertained diameters for each of the two rod-shaped articles 12 and to transmit output signals 26 denoting the averaged diameters as well as (if desired or necessary) the cross-sectional profiles and the departures of the measured cross-sections from a truly circular outline, preferably with a very high degree of accuracy.

FIG. 1 further shows that, in accordance with a presently preferred embodiment, the two measuring arrangements I and II are mirror images of each other with reference to a symmetry plane S disposed midway between the paths for the two rod-shaped articles 12. As already pointed out hereinbefore, the measuring arrangement II is or can be identical with the aforedescribed measuring arrangement I.

Figure 2:
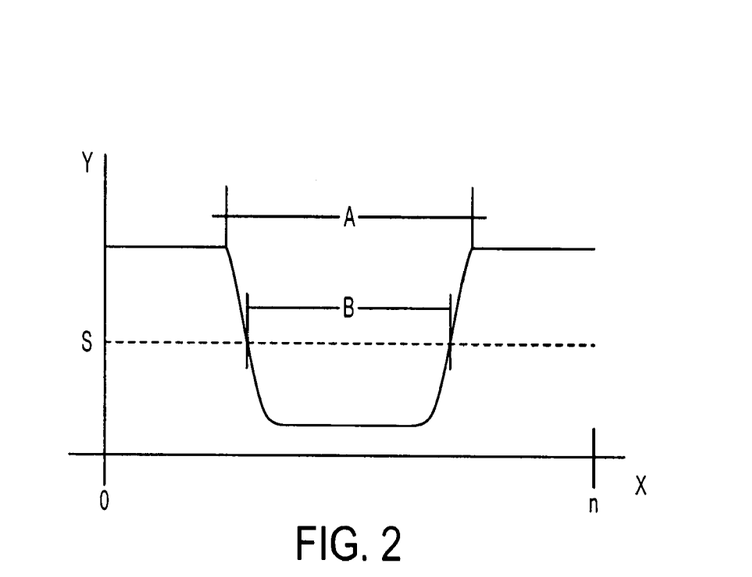
FIG. 2 is a diagram wherein the curve represents the progress of a typical signal denoting a transverse dimension of a rod-shaped article.

In the coordinate system of FIG. 2, the curve is indicative of a typical signal from the sensor 20 of one of the measuring arrangements I and II. The intensity of incident radiation is measured along the ordinate (Y-axis), and the abscissa (X-axis) denotes the positions of the cells (such as o-n) in the array of cells in the respective sensor 20. It will be seen that the intensity of radiation decreases pronouncedly in the (dark) region 18 where the article 12 intercepts the beam portion between the lateral portions 10a, 10b. In order to eliminate the lack of sharpness in the marginal zones, the evaluating circuit 24 is arranged to select a threshold S for a valid shade region B which serves as a basis for the calculation by the circuit 24 of the diameter in the selected cross-sectional plane or axis.

Figure 3:
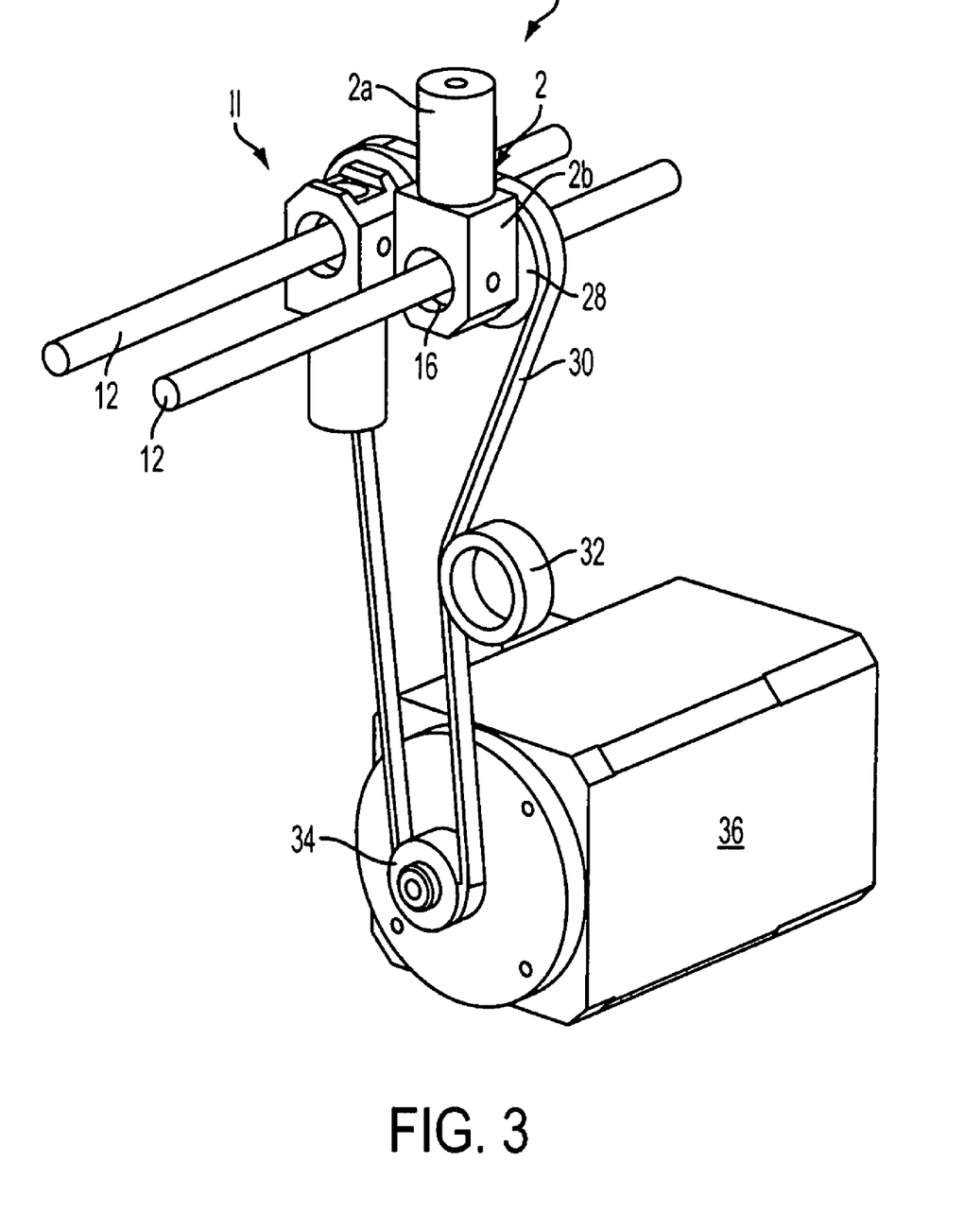
FIG. 3 is a smaller-scale perspective view of an apparatus which embodies the structure of FIG. 1.

FIG. 3 is a perspective view of the apparatus which is shown in FIG. 1. Again, only the measuring arrangement I is shown in full detail because the other measuring arrangement II is or can be a mirror image of the arrangement I. The housing 2 of the measuring arrangement I comprises two sections including a first section 2a which accommodates the radiation source 4, and a second section 2b for the sensor 20. The passage 16 is provided in the housing section 2b and receives a portion of the corresponding article 12 which is assumed to constitute a continuous cigarette rod or filter rod. The article 12 is assumed to be mounted, guided and transported in such a way that it can move lengthwise (axially) but does not turn about its longitudinal axis.

Each of the two housings 2 carries a fixedly mounted pulley or sprocket wheel 28 for a single endless belt or chain 30. The latter is tensioned by an idler pulley or sprocket wheel 32 and receives motion from a driver pulley or sprocket wheel 34 on the rotary output element of a preferably electronically controlled prime mover 36, e.g., a servomotor. The latter is set up to generate a time-linear oscillatory movement through angles of 180°. The oscillatory movement can but need not be synchronized with the movements of the rod-shaped articles 12 and/or with the production rate of the machine, not shown, which turns out the articles. The machine which turns out the articles 12 can include the structure shown in the aforementioned U.S. Pat. No. 4,893,640 to Heitmann et al. and/or that shown in the aforementioned U.S. Pat. No. 5,009,238 to Heitmann. Such dual cigarette rod making machine is the presently preferred machine, or one of presently preferred machines, wherein the improved apparatus can be put to use. The production rate as well as the setting of the preferably electronically controlled prime mover 36 can be resorted to in order to synchronize individual measurements of transverse dimensions of the articles 12 by the arrangements I and II with the operation (oscillatory movements) of the prime mover and/or of the rod making machine.

FIG. 3 shows each of the measuring arrangements I and II in one of their end positions in which the two arrangements are angularly offset through 180° relative to each other. Such mounting of the arrangements I and II exhibits the advantage that they can be installed in close proximity to each other and can be caused to turn away from each other through 180° but in the same direction, namely outwardly, without the danger of collision between the two arrangements. Thus, FIG. 3 shows a highly compact apparatus including the measuring arrangements I and II which is desirable in many tobacco processing machines, such as twin cigarette rod makers, wherein the space is or can be at a premium.

FIG. 3 further shows that the two measuring arrangements I ad II are offset relative to each other as seen in the axial direction of the parallel rod-shaped articles 12. Such apparatus exhibits the important advantage that, when it is put to use in conjunction with a machine which is designed to simultaneously turn out a plurality of normally parallel rods which are to undergo a measurement of their transverse dimensions, the simultaneously produced rod-shaped articles (12) can be measured in parallel because the oscillatory movements of the plural measuring arrangements (such as I and II) can be carried out in proper timely relationship under the influence of the electronic prime mover 36.

In the apparatus of FIG. 3, the beams 10 (not shown) of radiation in the housings 2 of the measuring arrangements I and II are caused to move in opposite directions. This is desirable when the apparatus is set up to simultaneously ascertain the transverse dimensions of two parallel rod-shaped articles. Each of the housings 2 is caused to turn between two end positions through an angle of 180° and, in each such end position, the orientation of one of the housings 2 is counter to that of the other housing. This can be readily seen in FIG. 3. If each of the measuring arrangements I and II includes a longer and a shorter section, the longer section of each of these arrangements should be pivotable away from the other arrangement. This renders it possible to reduce the dimensions of the improved apparatus as well as to reduce or eliminate the danger of collision of the arrangements I and II during movement between their end positions.

It is normally preferred to orient the arrangements I and II of the improved apparatus in such a way that the direction of propagation of the radiation beams 10 is at least substantially normal to the axes 14 of the respective articles. The axes about which the beams 10 and especially certain portions of the arrangements I and II are caused to turn are preferably parallel to or coincide with the axes 14 of the respective articles 12. This ensures that the beams are caused to move in planes which are normal to the respective axes 14. The angles A can be changed, i.e., they can be less than or they can exceed 180°, depending upon the desired number and orientation of transverse dimensions which are to be ascertained for the transmission of corresponding signals to the evaluating circuit 24. It is presently preferred to mount the housings 2 of the arrangements I and II in such a way that each of the beams 10 can move along an arc of at least 180°; this ensures that each of the two arrangements can ascertain the transverse dimensions of the entire cross-sectional area of the respective rod-shaped article. Consequently, the circuit 24 can determine the average diameter of each measured cross-sectional area of the respective rod-shaped article. Since, as a rule, the cross-sectional areas of long stretches of a cigarette rod or filter rod are at least substantially constant, the improved apparatus can readily ascertain, with a very high degree of accuracy, the average diameters of such long stretches as well as the eventual presence of out-of-round stretches and/or other deviations from the desired or acceptable cross-sectional outline.

The output signals 26 which are furnished by the evaluating circuit 24 can be utilized to prevent the unsatisfactory portions of the rod-shaped articles 12 from reaching the next processing station, e.g., a packing machine, a filter tipping machine or a cutoff which subdivides a continuous rod into sections of unit length or multiple unit length.

An important advantage of the improved method and apparatus is that they provide for a change of orientation of each beam 10 and the respective article 12 relative to each other subsequent to the first and each next-following measurement of the diameter (transverse dimension) of the respective article. This ensures that each measurement takes place from a different perspective. The beams 10 can impinge upon the respective articles 12 during the changes of orientation of the housings 2 and their contents relative to the articles. Each evaluating step can take up a short or very short interval of time, and successive measurements (of different transverse dimensions of the articles 12) can take place in rapid sequence. In other words, the sensors 20 can transmit to the circuit 24 a large number of discrete (successive) signals during each angular movement of the respective housings 2 through 180° or any other angular distance selected by the maker of the improved apparatus. The accuracy of determination of the cross-sectional outline of a rod-shaped article 12 while the respective housing 2 is caused to turn through an angle of say 180° is directly proportional to the number of signal generations at 20 during such turning of the housing.

A highly accurate determination of the exact cross-sectional outline of an article 12 by the simple expedient of resorting to a relatively high or very high number of signal generations per angular movement of the respective housing 2 constitutes a very important advantage of the method and apparatus of the present invention.

Another important advantage of the improved method and apparatus is that they can be resorted to for a highly accurate determination of cross-sectional outlines of the articles 12 or analogous at least substantially rod-shaped articles irrespective of whether the articles are exactly round, substantially round or out of round.

A further important advantage of the improved method and apparatus is that the aforementioned highly accurate determination of the cross-sectional outlines of the rod-shaped articles can be achieved without necessitating a turning of the articles about their respective longitudinal axes. Though it is possible to turn the rod-shaped articles about their longitudinal axes while the improved apparatus is in actual use, it is often of advantage if the articles need not be turned. In fact, under certain circumstances a turning of the rod-shaped articles about their longitudinal axes is undesirable or plain impossible. Examples of such rod-shaped articles are continuous cigarette rods or rods of filter material for tobacco smoke.

If an article to be tested is a continuous rod wherein a tubular wrapper contains a filler of smokable material, it can be maintained at a standstill while the respective measuring arrangement I or II performs its oscillatory movements along the arcs of say 180°. Alternatively, a rod 12 can be caused to move lengthwise (i.e., in the direction of its axis 14), either continuously or stepwise, while the respective housing 2 oscillates about such axis through angles of 180° or any other selected angle. This last mentioned mode of testing is particularly desirable if the improved apparatus is installed adjacent the path of a continuous cigarette rod, or one of several continuous rods, issuing from a cigarette rod making machine. Alternatively, the improved apparatus can be installed downstream of the cutoff which is utilized to subdivide a continuous cigarette rod into a series or file of discrete plain cigarettes of unit length or multiple unit length; the thus installed apparatus can be set up to test each of a series of successive discrete cigarettes or only selected cigarettes of such series.

Since the improved method and apparatus render it possible to ascertain a practically unlimited number of diameters (actually transverse dimensions) in a selected cross-sectional plane of a rod-shaped article, it is now possible to ascertain the smallest and the largest diameter with a heretofore unknown degree of accuracy, i.e., the improved method and apparatus render it possible to ascertain the exact cross-sectional outline of any selected portion of the rod-shaped article. The measurements enable the evaluating circuit 24 to ascertain whether or not the maximum and/or minimum diameter of the measured portion of the article is within an acceptable range.

It goes without saying that the improved method and apparatus can be utilized with equal advantage for the ascertainment whether or not the shapes of rod-shaped articles having an elliptical cross-sectional outline match or excessively depart from an acceptable or optimal elliptical outline. This is especially important when plain cigarettes having an elliptical outline are to be connected, end-to-end, with filter rod sections having an elliptical outline. Such procedure is normally carried out by resorting to adhesive-coated uniting bands, e.g., in a manner as fully disclosed in the aforementioned commonly owned U.S. Pat. No. 5,135,008 to Oesterling et al. Even relatively minor deviations of the outlines of filter rod sections required to have an elliptical cross-sectional outline from the outlines of so-called elliptical cigarettes would detract from the appearance and/or quality (such as the admission of excessive quantities of air at the junction of the plain cigarette with the filter rod section) of the oval or intended-to-be-oval filter cigarette.

In accordance with still another embodiment, the operation of the measuring arrangement I need not be exactly synchronized with that of the measuring arrangement II. However, it is often desirable, advantageous, simpler and less expensive to synchronize the operations of the two measuring arrangements, namely in such a way that each measurement which is being carried out by one of the arrangements I and II takes place simultaneously with a measurement being carried out by the other arrangement. This contributes to the simplicity of controls for the prime mover 36 and its pulley or sprocket wheel 34 and further ensures that the quality of testing of one of the rod-shaped articles 12 matches or very closely approximates the quality of testing of the other of the two articles.

Still further, it is within the purview of the present invention to temporarily test or to permanently test a single rod-shaped article, as well as to simultaneously test more than two articles and/or to simultaneously test two or more different rod-shaped articles, as long as the testing involves movements of the housing or housings relative to the corresponding article or articles.

The exact manner in which the circuit 24 or an equivalent thereof evaluates the signals being furnished by one or more mobile sensors 20 or their equivalents forms no part of the present invention. Each individual signal represents the corresponding transverse dimension of a rod-shaped article, i.e., a transverse dimension other than that or those measured prior or subsequent to the generation of such individual signal. This ensures a highly accurate ascertainment of the selected cross-sectional outline of the momentarily monitored portion of the rod-shaped article. As already explained hereinbefore, the accuracy of determination of the cross-sectional outline of a rod-shaped article can be increased or reduced by increasing or reducing the number of signals being generated by a sensor 20 (or an equivalent thereof) during each movement of the corresponding housing 2 relative to the rod-shaped article 12 being tested by the measuring arrangement embodying such housing.

The movements of a measuring arrangement (such as I or II) relative to the article 12 extending through the passage or opening 16 of the respective housing 2 must be controlled with a degree of accuracy which is necessary to ensure that the sensor 20 can generate signals which are accurately indicative of the respective transverse dimensions of the article. This can be readily achieved by selecting the width of the beam 10 in such a way that it is not less than the maximum transverse dimension (normally diameter) of a rod-shaped article capable of advancing or extending through the passage 16 of the housing 2. In other words, it is normally preferred that at least the beam portion 10a or 10b can impinge upon the sensor 20.

It is further within the purview of the present invention to employ one or more measuring arrangements (such as I and/or II) wherein the housings 2 or their equivalents are stationary and to further employ mobile radiation sources (4) and/or mobile sensor means (20) which can change their positions by resorting to suitable moving means which include or replace the parts 28, 30, 32, 34 and 36 of the illustrated apparatus. This can be readily achieved by employing mobile prisms, mirrors or analogous optical devices which serve to direct the non-intercepted part(s) of one or more beams 10 against the sensor(s) 20 or other suitable means for transmitting signals denoting non-intercepted portions of radiation to the corresponding input(s) of the evaluating circuit 24 or an equivalent thereof. Thus, and referring again to FIGS. 1 and 3, the sensors 20 can remain stationary if the measuring arrangements I and II comprise means (such as the aforementioned prisms and/or mirrors) which are capable of directing non-intercepted portions of the beams 10 against such stationary sensors. Irrespective of the exact mode of directing non-intercepted portions of the beams 10 against the respective sensors 20, it is presently preferred to synchronize the movements of the beam-directing means (such as the sensors 8 and the housings 2) of the two measuring arrangements with each other when the improved apparatus is set up to simultaneously ascertain the transverse dimensions of plural rod-shaped articles.

The housings 2 of the two measuring arrangements I and II shown in FIGS. 1 and 3 and the two beams 10 need not invariably move about the axes 14 of the respective rod-shaped articles 12. However, it is preferred that the points or axes or lines about which the housings 2 and/or the beams 10 turn be disposed within the confines of the respective rod-shaped articles 12. For example, each of the two beams 10 in the apparatus of FIGS. 1 and 3 can move along an imaginary plane which resembles a twin cone having two apices meeting at a point within the confines of the respective rod-shaped article 12.

In accordance with still another embodiment of the instant invention, at least one of the beams 10 (or a single beam if the improved apparatus is arranged to monitor the transverse dimensions of a single rod-shaped article) and especially at least a portion of the corresponding measuring arrangement can be set up to move in a plane which is disposed at an angle to the longitudinal axis of the respective rod-shaped article.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of ascertaining transverse dimensions of rod-shaped articles and, therefore, such adaptations should and are intended to be comprehended within the meaning and range of equivalence of the appended claims.

What is claimed is:

1. Apparatus for ascertaining the transverse dimensions of at least one at least substantially rod-shaped article while the article is maintained in a predetermined position, comprising a plurality of measuring arrangements for simultaneously ascertaining the transverse dimensions of a plurality of rod-shaped articles each of which is maintained in a predetermined position relative to the respective measuring arrangement, each measuring arrangement includes:

at least one radiation source arranged to direct a variable-orientation beam of radiation against the at least one article occupying said predetermined position whereby the article intercepts a portion of the beam which is indicative of a transverse dimension of the article;

a device for generating on the basis of the thus influenced beam of radiation signals denoting the transverse dimensions of the at least one article in plural orientations of the at least one article and the beam relative to each other; and means for selectively altering the orientation of the beam and the at least one article relative to each other wherein said measuring arrangements are adjacent each other and said altering means of each of said measuring arrangements include means for synchronously altering the orientation of beams generated by the radiation sources of said plurality of measuring arrangements.

2. The apparatus of claim 1, wherein the at least one article forms part of or constitutes a smokers' product.

3. The apparatus of claim 1, wherein said at least one measuring arrangement comprises at least one optical element.

4. The apparatus of claim 1, wherein said at least one radiation source is arranged to direct short-lasting beams of radiation against the at least one article occupying said predetermined position.

5. The apparatus of claim 1, further comprising means for maintaining the at least one article at a standstill during exposure to the beam of radiation.

6. The apparatus of claim 1, further comprising means for moving the at least one article during exposure to the beam of radiation.

7. The apparatus of claim 1, wherein said altering means includes means for moving one of the at least one article and the beam relative to the other thereof.

8. The apparatus of claim 1, wherein said radiation source is arranged to direct a beam at least substantially at right angles to a longitudinal axis of the article in said predetermined position.

9. The apparatus of claim 1, wherein said altering means includes means for turning the beam about an axis which is at least substantially parallel to a longitudinal axis of the article in said predetermined position.

10. The apparatus of claim 1, wherein said altering means includes means for turning the beam about an axis which coincides with a longitudinal axis of the article in said predetermined position.

11. The apparatus of claim 1, further comprising means for evaluating said signals and for generating output signals denoting averaged transverse dimensions of the article.

12. The apparatus of claim 1, wherein said orientation altering means comprises means for moving the beam relative to the at least one article.

13. The apparatus of claim 12, wherein said moving means is arranged to move the beam relative to a point within the at least one article in said predetermined position.

14. The apparatus of claim 1, wherein the number of said measuring arrangements is two.

15. The apparatus of claim 1, wherein said means for synchronously altering the orientation of said beams includes mobile components of said measuring arrangements and means for moving said mobile components in synchronism with each other relative to points located within the confines of articles assuming said predetermined positions relative to the respective measuring arrangements.

16. The apparatus of claim 15, wherein said moving means is arranged to move said mobile components relative to points located within the confines of the respective articles.

17. The apparatus of claim 16 for ascertaining the transverse dimensions of rod-shaped articles having longitudinal axes, wherein said points are located at least close to the axes of the respective articles.

18. The apparatus of claim 17, wherein said altering means of each of said measuring arrangements includes means for altering the orientation of said beams through angles of at least close to 180°.

19. The apparatus of claim 16 for ascertaining the transverse dimensions of rod-shaped articles having longitudinal axes, wherein said points are located in planes which are inclined relative to the axes of the respective articles.

20. The apparatus of claim 19, wherein said altering means of each of said measuring arrangements includes means for altering the orientation of said beams through angles of at least close to 180°.

21. The apparatus of claim 1, wherein the number of said measuring arrangements is two and said two measuring arrangements are adjacent each other, said means for synchronously altering the orientation of said beams having means for moving said beams in opposite directions.

22. The apparatus of claim 21, wherein said means for simultaneously altering the orientation of said beams is arranged to move each of the beams between two end positions in each of which said measuring arrangements are disposed at least substantially opposite each other.

23. The apparatus of claim 22, wherein each of said measuring arrangements comprises a housing having a longer section and a shorter section, said longer section of at least one of said housings being turnable away from the measuring arrangement embodying the other of said housings.

24. A method of simultaneously ascertaining the transverse dimensions of plural articles including at least one rod-shaped article while the articles are maintained in a predetermined positions, comprising the steps of:
directing a discrete variable-orientation beam of radiation against each of the plural articles occupying said positions whereby each article intercepts a portion of the respective beam which is indicative of a transverse dimension of the respective article;
repeatedly altering the orientation of the respective beam and respective ones of the plural articles relative to each other where the orientation altering step jointly moves respective discrete beams relative to the respective articles;
evaluating the non-intercepted portion of the respective beam in each orientation of the beam and of the respective ones of the plural articles relative to each other; and
generating on the basis of evaluated radiation signals denoting the respective transverse dimensions of a respective one of the plural articles.

25. The method of claim 24, wherein the at least one rod-shaped article forms part of or constitutes a smokers' product.

26. The method of claim 24, wherein said radiation is optical radiation.

27. The method of claim 24, wherein said directing step includes directing a short-lasting beam of radiation against the at least one article occupying said position.

28. The method of claim 24, wherein said altering step includes selectively changing the orientation of the beam relative to the at least one article.

29. The method of claim 24, further comprising the step of processing said signals into signals denoting the average transverse dimensions of the articles.

30. The method of claim 24, wherein said orientation altering step includes moving the beam relative to a point within the at least one article occupying said predetermined position.

31. The method of claim 30, wherein the beam is supplied by source of radiation and said moving step includes turning the radiation source relative to said point.

32. The method of claim 31, wherein the source forms part of a measuring arrangement and said moving step includes turning at least a portion of the measuring arrangement relative to said point, said point being located in a plane which is inclined relative to a longitudinal axis of the article occupying said predetermined position.

33. The method of claim 30, wherein said point is located in a plane which is inclined relative to a longitudinal axis of the article occupying said predetermined position.

34. The method of claim 30, wherein said moving step includes turning the beam relative to said point through an angle at least approximating 180°.

35. The method of claim 24, wherein said directing step includes orienting the beam to impinge upon the article occupying said predetermined position at least substantially at right angles to a longitudinal axis of the article.

36. The method of claim 24, wherein said orientation altering step includes moving the beam relative to the article about one of two axes one of which is at least substantially parallel to and the other of which coincides with a longitudinal axis of the article occupying said predetermined position.

37. The method of claim 24, wherein said directing step is carried out by a radiation source in a housing of a measuring arrangement and said orientation altering step includes moving at least a portion of the measuring arrangement between a plurality of positions relative to the at least one rod-shaped article occupying said predetermined position.

38. The method of claim 37, wherein said directing step includes short-lasting exposure of the article to radiation in each of said plurality of positions of said portion of the measuring arrangement.

39. The method of claim 24, wherein said orientation altering step includes moving said discrete beams in synchronism with each other.

40. The method of claim 24, wherein said orientation changing step includes moving the beam for one of said plural articles in a first direction and moving the beam for another of said plural articles in a second direction at least substantially counter to said first direction.

41. The method of claim 24, wherein the plural articles include first and second articles located close to each other and said orientation altering step includes turning the beams for the first and second articles between two end positions in each of which the beam for one of the first and second articles is located opposite the beam for the other of the first and second articles.

42. The method of claim 41, wherein the beams for the first and second articles are furnished by discrete first and second measuring arrangements having housings including shorter and longer sections, the longer section of each of the housings being arranged to turn away from the other measuring arrangement in response to turning of the respective beams to selected end positions thereof.

* * * * *